H. E. ANDERSON.
BRAKE AND CLUTCH CONTROL MECHANISM FOR SELF PROPELLED VEHICLES.
APPLICATION FILED MAY 25, 1921.
1,433,771. Patented Oct. 31, 1922.
3 SHEETS—SHEET 2.
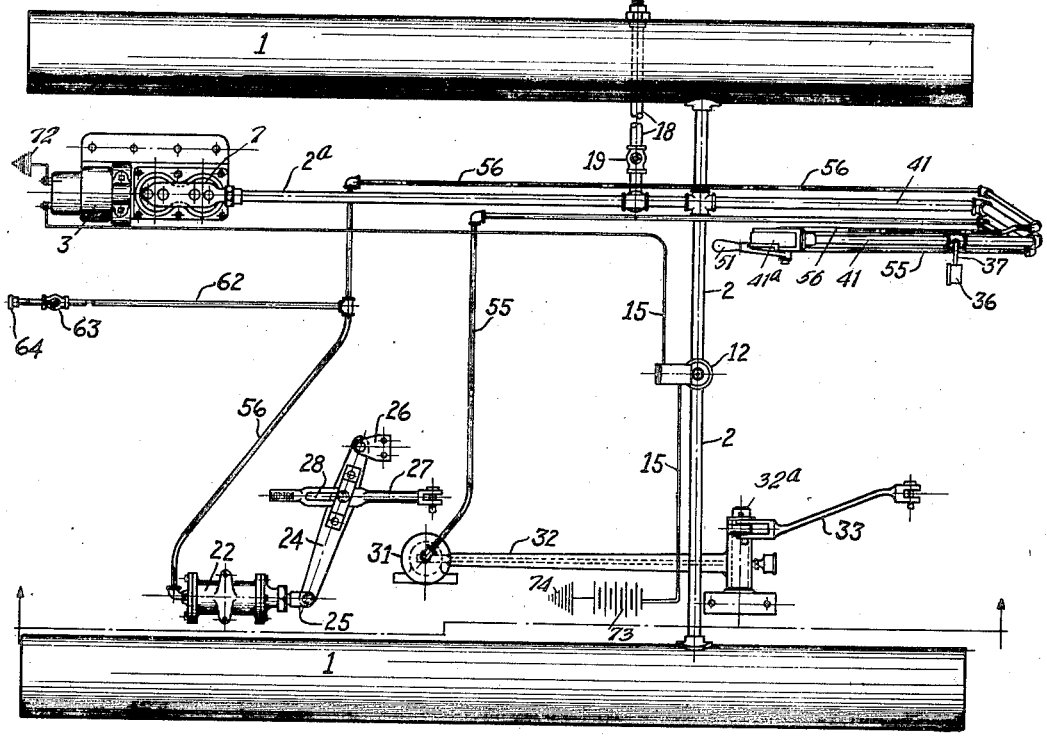
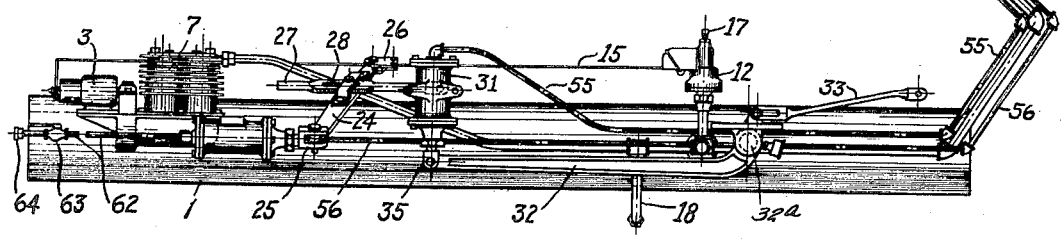
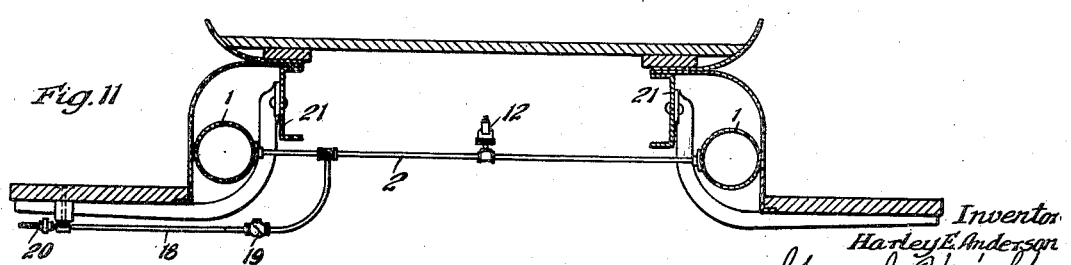

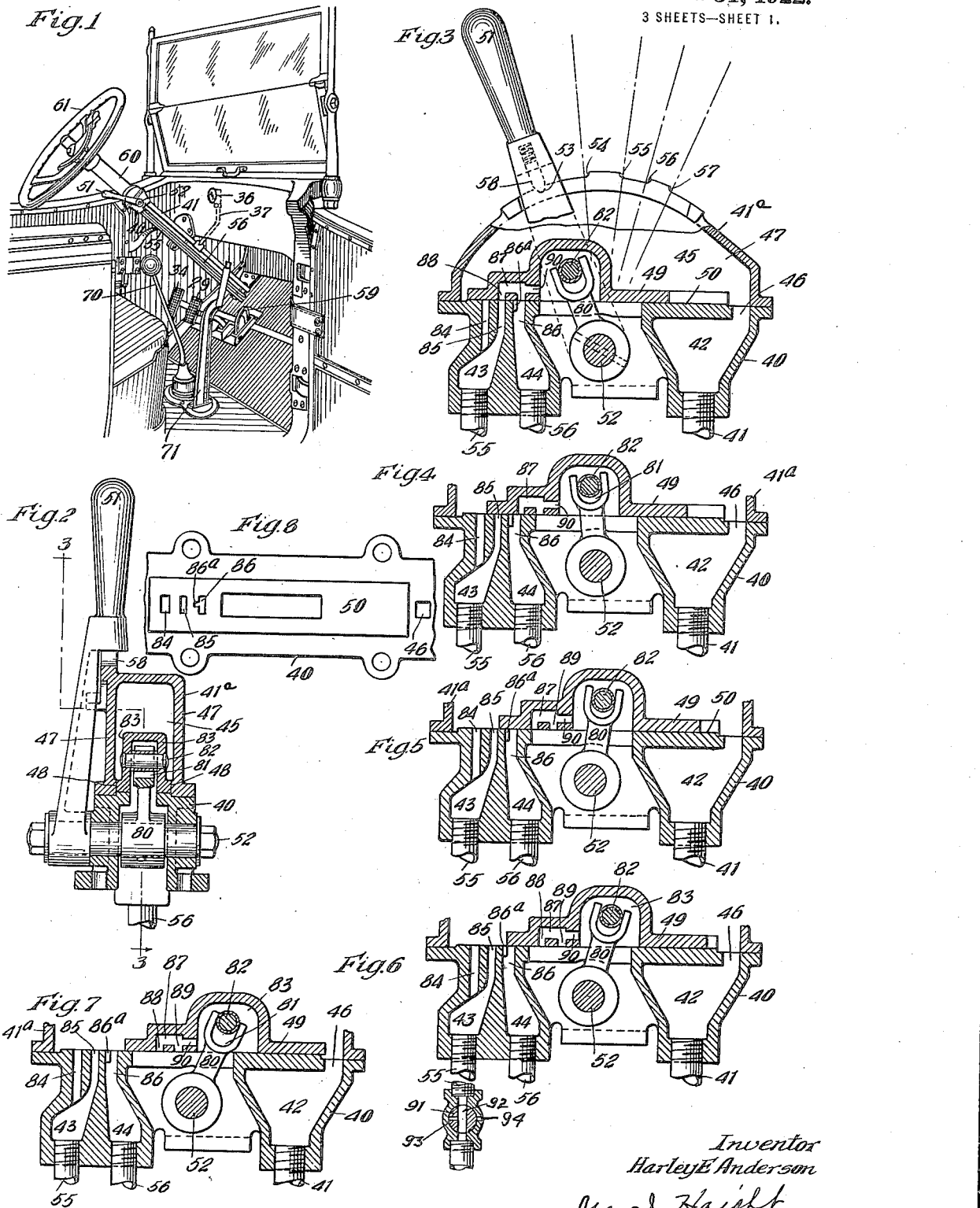

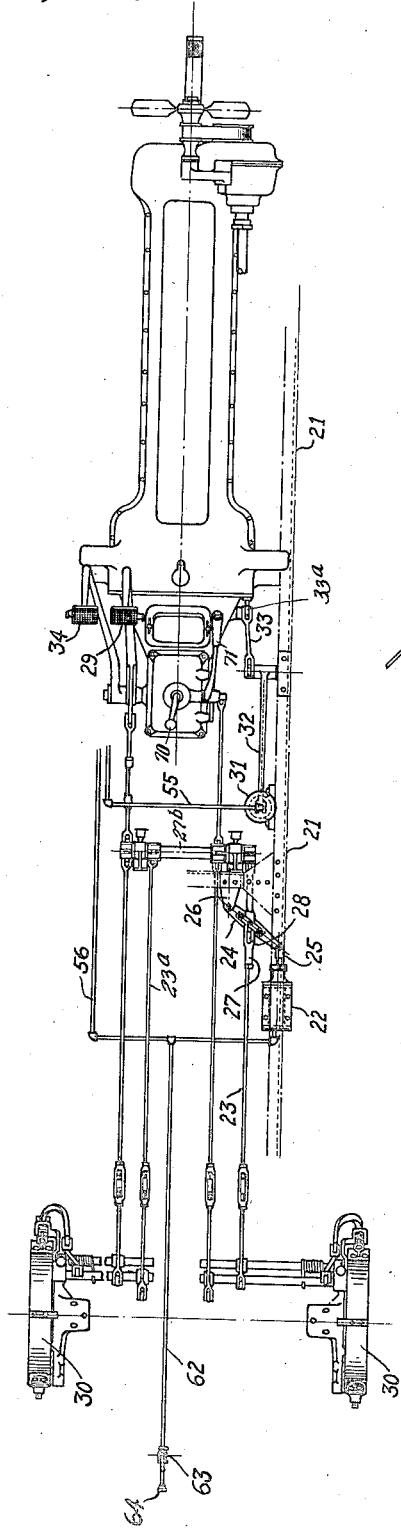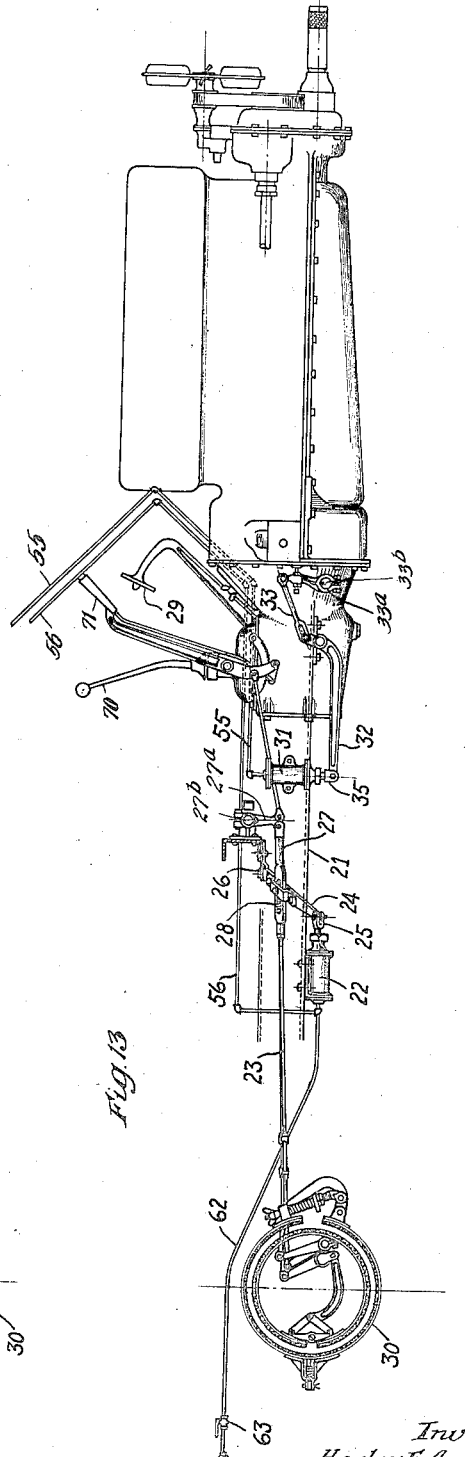

Patented Oct. 31, 1922.

1,433,771

UNITED STATES PATENT OFFICE.

HARLEY EDWARD ANDERSON, OF CHICAGO, ILLINOIS.

BRAKE AND CLUTCH CONTROL MECHANISM FOR SELF-PROPELLED VEHICLES.

Application filed May 25, 1921. Serial No. 472,539.

*To all whom it may concern:*

Be it known that I, HARLEY EDWARD ANDERSON, a citizen of the United States, residing at Chicago, in the county of Cook and State of Illinois, have invented a certain new and useful Improvement in Brake and Clutch Control Mechanisms for Self-Propelled Vehicles, of which the following is a full, clear, concise, and exact description, reference being had to the accompanying drawings, forming a part of this specification.

This invention relates to improvements in brake and clutch control mechanisms for self-propelled vehicles.

In the art of self-propelled vehicles, especially automobiles and trucks, it is customary to employ a foot-controlled brake and also a foot-controlled clutch. In operating such vehicles, it is customary to first throw out the clutch between the motor and the driven wheels before applying the brakes. In addition, it is also customary on such vehicles, to employ a foot-controlled accelerator. The result is that the operator must become quite skilled and also remain thoroughly calm under all emergencies in order to properly manipulate the brake, clutch and accelerator in proper sequence and also to a proper degree in order to avoid accidents. The use of the foot-operated pedals for the clutch and brake mechanism requires considerable strength and, during long runs, is exceedingly fatiguing to the operator and particularly in the case of women and persons of short stature, does the operation and control of the vehicle become comparatively difficult even though the operator is otherwise skilled.

One object of my invention is to provide a control mechanism especially adapted for self-propelled motor vehicles such as automobiles and trucks wherein the control may be effected with a minimum of effort by even unskilled persons and without the necessity of operating the usual foot pedals governing the brake and clutch devices so that the operator will not become unduly fatigued and will furthermore not be adversely affected in an emergency, thereby minimizing danger from accidents.

Another object of the invention is to provide a control mechanism of the character indicated in the preceding paragraph which may be readily adapted and applied to automobiles and trucks as now equipped without the necessity of any changes in the brake and clutch mechanisms.

Another and more specific object of the invention is to provide a compressed air system by which the control above outlined may be effected with a minimum of effort and in fact, simply by the operation of a single control lever.

A still further object of the invention is to provide a compressed air control arrangement as outlined in the preceding paragraphs wherein the sequence of operations must necessarily be such that the clutch is rendered inoperative before it is possible to affect the brake mechanism.

Other specific objects of the invention are: to provide a compressed air control arrangement so designed that the vehicle on which it is used may be coupled to trailers equipped with corresponding air brake arrangements and simultaneous control of the leading vehicle and all trailers accomplished by the operation of a single control valve; and to provide an arrangement wherein the air pressure is created by a motor-operated compressor carried by the vehicle or, in emergencies, so that the compressed air may be obtained and stored from an independent source as for instance, at the usual gasoline stations and garages where compressed air is generally supplied free.

Other objects of the invention will more clearly appear from the description and claims hereinafter following.

In the drawings forming a part of this specification, Figure 1 is a perspective view of a portion of an automobile showing a common arrangement of clutch and brake pedals, gear shift, emergency brake, steering post and accelerator with my improvements employed in connection therewith. Figure 2 is a vertical sectional view of the control valve. Figure 3 is a sectional view corresponding substantially to the section line 3—3 of Fig. 2, certain parts being broken away, and illustrating the positions assumed by the parts when the valve is in release position. Figs. 4, 5, 6 and 7 are sectional views similar to Fig. 3 and illustrating the positions of the parts corresponding to clutch release condition, lap condition, brake service application, and emergency application of the brake, respectively. Fig. 8 is a top plan view of the lower part of the valve casing showing in the plan the various parts thereof; Fig. 9 is a plan lay-out of the air-controlled brake and clutch arrangements. Fig. 10 is a perspective lay-out of the arrangement shown in Figure 9. Fig. 11 is a transverse, sectional view of a portion of an automobile body and chassis illustrating more particularly the location of the compressed air storage tanks. Fig. 12 is a plan lay-out illustrating more particularly the mechanisms for operating the brakes and the clutch in conjunction with the engine or motor of the vehicle. And Fig. 13 is an elevational view of the parts shown in Figure 12.

In the drawings and referring more particularly to Figure 1, the automobile is shown as equipped with a clutch control foot pedal 34; a foot-controlled brake pedal 29; an accelerator 59; a steering post 60; a steering wheel 61; a gear shift lever 70 and an emergency brake lever 71, said parts illustrating a well known arrangement found on certain commercial types of automobiles. As is customary, the normal position of the clutch pedal 34 is with the clutch in operative condition and the normal position of the brake pedal 29 is with the brake in inoperative position.

In carrying out my invention, I preferably employ two compressed air storage tanks 1—1 extended lengthwise of the chassis 21, one on each side thereof adjacent the running boards and beneath the usual running board flashings, as best illustrated in Figure 11. Said tanks are connected by a common pipe 2, as illustrated in Figures 9 and 11. Compressed air is normally supplied to the tanks 1 from a compressor 7 adapted to be operated by an electric motor 3, both of which are conventionally illustrated in Fig. 9, there being a pipe line 2ª leading from the compressor to the said common pipe 2. The motor 3 may be operated from the usual storage battery found on most automobiles and trucks, one wire being grounded to the machine as indicated at 72, the other wire 15 leading to the storage battery 73, as shown in Fig. 9. As will be understood, the opposite side of the battery 73 is also grounded to the frame of the machine as indicated at 74. Included within the electrical line 15 is an adjustable pressure-controlled electric switch indicated conventionally at 12. Said switch may be of any suitable design adapted to close the switch when the pressure falls below a predetermined amount and to open the switch and thereby break the circuit when the pressure rises above a predetermined amount, said control switch being preferably included in the pipe line 2 as shown in Fig. 9.

Referring now to the control valve construction and operation thereof and particularly with reference to Figures 2 to 8 inclusive. The valve casing is shown as comprising a lower section 40 and an upper section 41ª, the same being suitably secured together with an air-tight joint between them. The valve casing section 40 is provided with an air chamber 42 which is in communication with the main air supply pipe 41 communicating with the main reservoir. In addition, there is provided in the said section an air chamber 43 which is in communication with the pipe 55 leading to the clutch cylinder. The third chamber 44 is formed in said section of the casing, said chamber 44 being in communication with the pipe 56 leading to the brake cylinder.

The upper section 41ª of the valve casing is hollow so as to provide a substantially semi-cylindrical chamber 45 which is always in communication with the chamber 42 through the port 46. The side walls 47—47 of the upper section 41ª, along their lower edges, provide longitudinally extending guides 48—48 for a valve slide 49 which reciprocates back and forth on the upper flat surface 50 provided therefor on the casing section 40.

The slide 49 is operated by a control handle or lever 51 which is pivotally mounted on a suitable bolt 52 extending transversely through the casing section 40 below the slide 49 as shown in Figures 2 and 3. The upper surface of the casing section 41ª is formed on the arc of the circle concentric with the center of oscillation of the lever 51 and is provided with a notch 53, a shoulder 54, a shoulder 55, a shoulder 56 and a shoulder 57, said notch and shoulders corresponding respectively with the release, clutch release, lap, brake service application and brake emergency application positions, respectively. A spring-controlled plunger 58 is carried by the said lever to automatically position the lever in one of the desired positions. If desired, the top face of the casing section 41 may have cast thereon suitable inscriptions or legends corresponding to the several positions of the control lever.

The lever 51 is operatively connected with the slide 49 by means of a crank arm 80 which is secured to the bolt or shaft 52 at a point within the casing section 40 as shown best in Fig. 2. Said crank arm 80, at its free end, is formed with an elongated notch 81 which straddles a rivet 82 that extends transversely of and is mounted in up-standing side walls 83—83 formed on slide 49. The ends of the rivet 82 are upset so as to provide an air-tight joint and in this connection it will be noted that the air pressure is always on the top of the slide 49, thus tending to securely hold it to its sliding seat and prevent leakage. This is of considerable importance in a compressed air controlled valve where the pressures are relatively high, and unless otherwise provided for, continuously tend to lift the movable valve member from its seat and thus permit leakage.

From the chamber 43 extend two vertical laterally separated passages or ports 84 and 85. Another vertical extending port or passage 86 is in communication with the chamber 44. All of said ports or passages are of rectangular form as shown in Fig. 8 and in connection with the port or passage 86 it will be noted that there is an additional slide on the off-set notch or recess 86ª on the side nearest the port 85. The under side of the slide 49 at the left hand end as viewed in Fig. 3 is formed with a passage 87 having two downwardly extended ports 88 and 89 adapted to aline successively with the ports 84, 85 and 86 as hereinafter described. An escape port 90 leads from said passage 87 to the atmosphere.

The operation is as follows, assuming all of the parts in the position shown in Figure 3, that is, in full release. It will be remembered that the clutch is normally in operative position. The operator by shifting the control lever 51 to the first position corresponding to the shoulder 54, will cause the slide 49 to assume the position shown in Fig. 4. This uncovers the port 84, thus permitting air to pass into the chamber 43 and, through the pipe 55, to the clutch cylinder 31. Admission of air to the cylinder 31 forces out the piston 35 to which is connected the elongated end of a lever 32 pivoted as indicated at 32ª in Figure 10. The opposite end of said lever 32 is connected by a slidable pivoted pin and slide joint to a link 33 which in turn is pivotally connected to a lever 33ª secured to the clutch operating shaft 33ᵇ as shown in Figures 12 and 13. From the preceding, it will be seen that, upon moving the control lever to the shoulder 54, the clutch will be disengaged or rendered inoperative. This condition is used when it is desired to have the vehicle coast and, as will be understood by those familiar with the operation of automobiles, it is necessary to disengage the clutch before application of the brakes so that my control valve takes care of this condition also. Because of the slidable pin and slot pivotally connected between the lever 32 and link 33 as shown in Fig. 10, it will be seen that my clutch operating arrangement does not in any wise interfere with the ordinary operation of the clutch control pedal 34 nor is there any change in the clutch mechanism proper, but on the contrary there is merely interposed between the usual lever 33ª provided on the automobile and the cylinder 31, the link 33 and lever 32.

When the control lever 51 is shifted to the shoulder 55 or lap condition, which is indicated in Fig. 5, both ports 84 and 85 will be uncovered but this does not further affect the clutch. At the same time, the port 86 and notch 86ª thereof will be completely covered. This lap condition is employed as a desirable step in shifting to the brake application positions.

By shifting the lever 51 to the next position, that is, to the shoulder 56 which corresponds to Fig. 6 of the drawing, the notch 86ª will be uncovered while at the same time the ports 84 and 85 remain uncovered as before. Due to the restricted area of the notch 86ª, the amount of air which will pass to the chamber 44 is restricted. Admission of air to the chamber 44 allows the air to pass through the pipe 56 to the brake cylinder 22, shown in Figures 9 and 10. Admission of air to the cylinder 22 forces out the piston and rod 25 thereby actuating the lever 24 which is pivotally connected at one end to the rod 25 and fulcrumed at its opposite end to a bracket 26 secured to a suitable part of the frame or chassis. The lever 24 has a slidable pivotal connection by means of a pin and slide 28 with a link 27 which is connected at one of its ends to a lever 27ª as shown in Fig. 13. The opposite end of said link 25 is adjustably threaded to a connecting rod 23 (see Figures 12 and 13). The rod 23 in turn is operatively connected to a lever controlling the application of one of the brake bands 30. The lever 27ª is connected to a cross shaft 27ᵇ to which in turn is connected another connecting rod 23ª, the latter being operatively connected to the opposite brake band 30, as shown in Fig. 12. The shaft 27ᵇ is connected by suitable linkage to the brake pedal 29. From the preceding, it will be seen that the admission of air to the cylinder 22 causes actuation of the lever 24 and the latter in turn will produce a service or relatively light application of the brake bands.

In most instances it will be true that the operator will not desire the maximum service application of the brake bands, and under such conditions, the operator will maintain the control lever 51 against the shoulder 56 until the desired degree of braking has been obtained and the car brought under control, whereupon the control lever 51 will be shifted back to the lap position corresponding to the shoulder 55 in which position of the control lever, the clutch will be maintained inoperative and the brake bands in desired position.

For an emergency application of the brakes, that is, with as great a speed as possible, the operator shifts the control lever 51 to the shoulder 57 which corresponds to Fig. 7. In this condition of the parts, it will be noted that the port 86 is completely uncovered thus admitting air to the brake cylinder very rapidly and allowing the brakes to be applied to the maximum amount permitted by the cylinder and associated parts.

In carrying out my invention, I will so regulate the area of the brake cylinder 22 and contained piston and the leverage rations that the possible maximum service application of the brake band operated from the cylinder 22 will be equivalent to approximately 90% of the light weight of the vehicle, thereby preventing locking of the wheels, preventing skidding and undue wear on the tires; and obtaining the maximum efficiency in braking the car or bringing it to a stop. This provision is of importance, inasmuch as the service application of the brake bands by the air control arrangement is entirely independent of the judgment of the operator. In the ordinary application of the brake bands by means of the foot pedal, the operator either applies the brake bands too lightly or too severely or with a fluctuating pressure, which is a frequent cause of accident in addition to producing undue wear on the tires.

To restore all of the parts to normal condition, the operator shifts the lever 51 back to the first position as indicated in Fig. 3. This uncovers the ports 85 and 86 and permits the air to escape through ports 88 and 89, passage 87 and exhaust port 90 to the atmosphere. During the operation of the air controlled devices, it will be seen that the operator is not required to move his feet from the accelerator 59. Furthermore, it will be seen that both the operation of the clutch and the brake bands will cause depression of the foot pedals 34 and 29, thus always giving visual evidence to the operator of the changing conditions arising by reason of the operation of the control lever 51. Preferably I also provide a suitable gauge 36 on the instrument board in communication with the pipe 41 by branch pipe 37 to indicate the pressure in the storage tanks and air lines.

In order to prevent killing of the engine, during starting or when the engine is running slowly and when the operator allows the clutch to become engaged, the following arrangement may be employed as best shown in Fig. 6. Included within the pipe line 55, in a convenient position close to the control valve, is a manually operable, rotatable stopcock 91. The latter is provided with a main passage 92 from which extends at right angles a relatively small port 93. A bleeder port 94 is formed in the surrounding valve casing, located as shown. Assuming that the engine is running slowly and that the clutch has been disengaged by the proper manipulation of the control valve, the operator turns the cock 91 so as to close communication from one side of the cock to the other side in the pipe 55. This brings the port 93 into communication with the lower side of the pipe 55, that is, the side communicating with the clutch air cylinder, and permits the air to escape or bleed very slowly through the port 94 to the atmosphere. This allows of the gradual return of the clutch parts to operative condition. When the engine is running at normal speeds, the cock 91 is turned so as to bring the passage 92 in communication with both sides of the pipe 55 and thus permit the actuation of the clutch from the main control valve in the manner hereinbefore described.

In the event of failure of the supply of electricity for the motor 3, the failure of the motor 3 or compressor 7, it is desirable to provide for the introduction of compressed air to the tanks 1 from an outside source, as for instance an air service station and to this end a pipe 18 is connected with the pipe 2ª, said pipe 18 having at its outer end a suitable threaded hose connection nipple 20 as indicated in Figure 9. A check valve 19 is employed in the pipe line 18 to prevent escape of the air.

It is now quite common to employ a main truck and one or more trailers in transporting merchandise and heretofore great difficulty has been experienced in effecting control of the trailers. As will be evident to those skilled in the art, it is highly desirable, in order to prevent the jerking apart of and to prevent collision or bumping between any two vehicles of a train, that the brakes on all units be applied simultaneously and uniformly, as in the operation of a railway train. To provide for this convenience, where the trailer or trailers are provided with an air brake system such as shown in this application, I employ a pipe 62 in communication with the pipe 56, said pipe 62 leading out at the rear of the vehicle and having included therein a shut-off cock 63. A suitable nipple 64 is attached to the end of the pipe line in order to permit the attachment of a flexible hose coupling to the next adjacent trailer. Where no trailers are employed, the shut-off cock 63 will of course be closed, but where a trailer is connected, said cock 63 will be open and hence operation of the brake on the leading vehicle will induce a similar and simultaneous application of the brakes on the trailer or trailers.

I have herein shown and described what I now consider the preferred manner of carrying out the invention but the same is by way of illustration only and not by way of limitation, all changes and modifications being contemplated that come within the scope of the claims appended hereto.

I claim:

1. In a self-propelled vehicle having a motor, clutch, brake, manually operable mechanism for operating the clutch, and manually operable mechanism for operating the brake; the combination with a source of compressed air; of means, including an air cylinder and connections therefrom, for operating said clutch independently of the manual clutch mechanism; means including an air cylinder and connections therefrom, for operating said brake independently of the manual mechanism; and a manually operable valve arranged to control admission of compressed air from said source to both of said cylinders, said valve having ports so arranged that compressed air is admitted to the clutch cylinder prior to the admission of air to the brake cylinder.

2. In a self-propelled vehicle having a motor, brake, and manually operable mechanism for actuating the brake; the combination with a source of compressed air; of an air cylinder; connections between said air cylinder and the brake for actuating the latter; a pipe line, having a control valve included therein, extending between said source of compressed air and said cylinder; and a branch pipe line in communication with said pipe line between the control valve and the cylinder, said branch line extending to the rear of the vehicle and adapted to be connected to a similar system of a trailing vehicle.

3. In a self-propelled vehicle having a motor, clutch, brake, manually operable mechanism for actuating the clutch, and manually operable mechanism for actuating the brake; the combination with a source of compressed air; of an air cylinder and connections therefrom to the clutch adapted to actuate the latter; of a second air cylinder and connections therefrom to the brake adapted to actuate the latter; pipe lines providing communication from said source of compressed air to each of said cylinders and having included therein a control valve; and a branch line in communication with the air line to the brake cylinder, said branch line being adapted to provide an air connection for a corresponding system of a trailing vehicle.

4. In a self-propelled vehicle having a motor, clutch, and manually operable mechanism for actuating the clutch, a brake, and manually operable mechanism for actuating the brake, and a steering post; the combination with a source of compressed air on the vehicle; an air cylinder and connections therefrom to said brake adapted to actuate the latter independently of the manually operable brake mechanism; a second air cylinder and connections therefrom to the clutch adapted to actuate the latter independently of the manual brake operating mechanism; pipe lines providing communication between said source of compressed air and each of said cylinders, said pipe lines having included therein a common control valve mounted on the steering wheel post, said control valve being provided with control ports corresponding to open, clutch cylinder brake, lap, and combined clutch and brake cylinder positions.

5. In an air brake apparatus, a control valve comprising: a valve casing having an air receiving chamber therein and a flat ported valve seat, a slide valve plate cooperable with said seat, said plate being slidable within said air chamber and so arranged that the air pressure forces the valve plate close to its seat, and an operating handle connected to said plate on a side thereof exposed to the atmosphere.

6. In a self-propelled vehicle having a motor, clutch, brake, manually operable mechanism for operating the clutch, and manually operable mechanism for operating the brake: the combination with a source of compressed air; of means, including an air cylinder and connections therefrom, for operating said clutch independently of the manual clutch mechanism; means, including another air cylinder and connections therefrom, for operating said brake independently of the manual brake mechanism; and a manually operable valve arranged to control admission of compressed air from said source to both of said cylinders.

7. In a self-propelled vehicle having a motor, brake, manually operable mechanism for actuating the brake: the combination with a source of compressed air; of an air cylinder; connections between said air cylinder and the brake for actuating the latter; a pipe line extending between said source of compressed air and said cylinder; a branch pipe line extending to the rear of the vehicle and adapted to be connected to an air brake system of a trailing vehicle; and means for regulating the operation of said air cylinder and admission of air to said branch line.

8. In an air brake apparatus: a valve casing having an air receiving chamber therein and a flat ported valve seat, a slide valve plate cooperable with said seat, said plate being slidable within said air chamber and subject to the air pressure within said chamber in a manner to force the valve plate close to its seat, a portion of said valve plate on the side opposite from that side subject to the air pressure within the chamber, being open to atmospheric pressure, and means connected to said portion of the valve plate exposed to the atmosphere for operating the plate.

9. In a self-propelled vehicle having a motor, clutch, manually operable mechanism for actuating the clutch, a brake, a manually operable mechanism for actuating the brake: the combination with a source of compressed air on the vehicle; and compressed air operated means supplied from said source, for actuating the clutch and brake of the vehicle, said means including a manual control valve ported to provide open, clutch, service brake application and emergency brake application positions.

10. In an air brake apparatus, a control valve of the character described comprising: a valve casing having an air receiving chamber therein and a flat valve seat, said valve seat being provided with an admission port, an outlet port for one air cylinder, a second outlet port for another cylinder, said last named outlet port having a portion of restricted area communicating with the main portion, and a slide valve adapted to successively uncover said first mentioned outlet port, the restricted portion of the second outlet port, and finally the entire second outlet port.

In witness that I claim the foregoing I have hereunto subscribed my name this 21st day of May 1921.

HARLEY EDWARD ANDERSON.

Witnesses:
 CARRIE GAILING,
 ANN BAKER.